United States Patent [19]

Fink

[11] 3,731,628
[45] May 8, 1973

[54] GRAIN SUPPORT FOR SOLID PROPELLANT ROCKET MOTOR

[75] Inventor: Robert H. Fink, Huntsville, Ala.

[73] Assignee: The United States of America as represented by the Secretary of the Army, Washington, D.C.

[22] Filed: Oct. 1, 1971

[21] Appl. No.: 185,494

[52] U.S. Cl...................102/49.3, 60/255
[51] Int. Cl..............................F02k 9/04
[58] Field of Search................60/255, 253

[56] References Cited

UNITED STATES PATENTS

| | | | |
|---|---|---|---|
| 3,023,570 | 3/1962 | Crouch | 60/255 |
| 2,988,877 | 6/1961 | Shope | 60/255 |
| 3,017,743 | 1/1962 | Adelman | 60/253 |
| 3,029,734 | 4/1962 | Allenson | 60/253 |
| 2,488,154 | 11/1949 | Africano | 60/255 |

Primary Examiner—Carlton R. Croyle
Assistant Examiner—Robert E. Garrett
Attorney—Harry M. Saragovitz et al.

[57] ABSTRACT

A solid propellant rocket motor having a plurality of propellant sheets supported in a manner that the sheets can be burned from both sides without blowing the propellant sheets out of the nozzle at the rear of the rocket motor.

2 Claims, 2 Drawing Figures

PATENTED MAY 8 1973 3,731,628

Robert H. Fink,
INVENTOR.

Harry M. Saragovitz
Edward J. Kelly
BY Herbert Berl
Herbert H. Murray

GRAIN SUPPORT FOR SOLID PROPELLANT ROCKET MOTOR

BACKGROUND OF THE INVENTION

An anti-tank rocket requires an extremely short burning period. One way to achieve such a short burning time is to use thin sheets of propellant and allow the propellant to burn on both sides. This presents a problem in that after the propellant has partially burned the remaining propellant is blown out of the rear end of the nozzle thus losing some of the impulse from the propellant plus the total impulse applied to the rocket cannot be accurately calculated since the amount of propellant which is blown out of the rear is indeterminant.

In accordance with these precepts it is an object of this invention to provide a rocket motor wherein the propellant is provided in cylindrical sheets which are bonded to a substrate which in turn is fixed to a support member adjacent the forward end of the rocket motor.

DETAILED DESCRIPTION OF THE INVENTION

Figure 2:
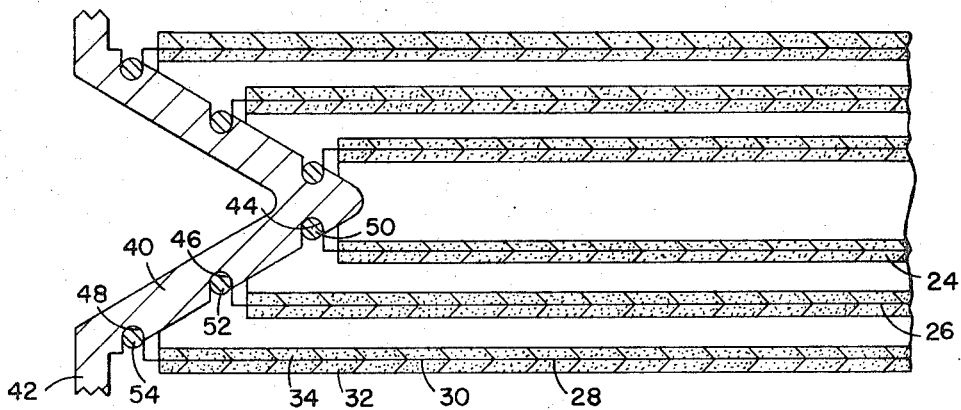
FIG. 2 is a section illustrating the rocket propellant and the manner in which it is mounted and supported within the rocket motor.
Figure 1:
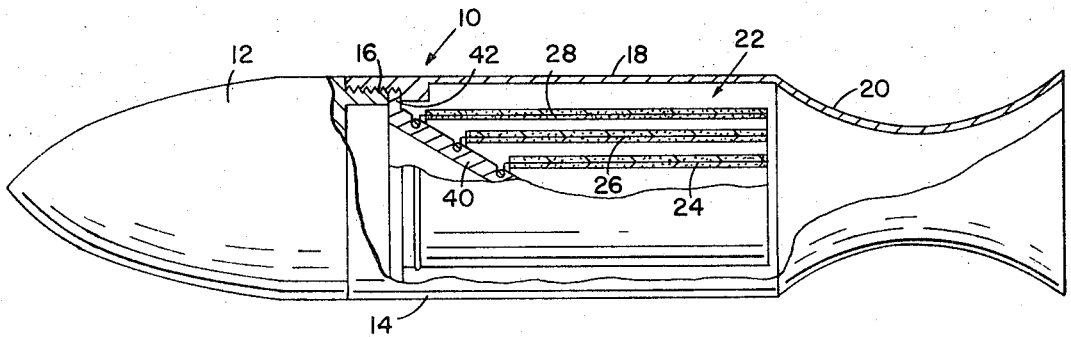
FIG. 1 of the drawing is a small rocket partially in section showing the grain within the motor portion thereof.

Referring now to FIG. 1 of the drawing a rocket generally indicated 10 comprising a warhead section 12 and a rocket motor 14 threaded together as indicated at 16. The rocket motor comprises a casing 18 and a nozzle 20. Within the casing 18 there is mounted a propellant grain generally indicated 22 and comprising a plurality of concentric cylinders 24, 26 and 28. As best seen in FIG. 2 each of the cylinders comprises a substrate 30 made of screen wire mesh or polyglass or similar type material, with propellant sheet 32 and 34 bonded to the inner and outer surfaces thereof.

A conical shaped support member 40 having an outwardly projecting flange 42 at its base portion and a plurality of grooves 44, 46 and 48 is mounted with the flange 42 confined between the forward end of the casing 18 and the rear end of the warhead 12. The forward ends of the substrate 30 of each of the cylindrical assemblies 24, 26 and 28 extend forwardly from the area covered by the propellant sheets 32 and 34 and are crimped within the grooves 44, 46 and 48 respectively and are retained therein by retaining rings 50, 52 and 54 respectively.

When the rocket is fired the propellant sheets 32 and 34 burn inwardly toward the substrate 30 therebetween thus providing a very short burning time and high impulse to the rocket assembly 10. The crimping of the forward edges of the substrate 30 within the grooves 44, 46 and 48 of the support member 40 prevents the unburned portions of the propellant sheets from being blown outwardly through the nozzle 20.

I claim:
1. A solid propellant rocket motor comprising:
   a casing,
   a warhead screwed into the forward end of said casing,
   a series of concentric cylindrical members mounted within said casing,
   solid propellant sheets bonded to the inner and outer surfaces of said cylindrical members,
   a conical support member fixed adjacent the forward end of said casing,
   a series of grooves on the outer surface of said support member,
   the forward ends of said cylindrical members being crimped into said grooves, and
   retaining rings retaining said crimped portions of said cylindrical members in said grooves.
2. A rocket motor as set forth in claim 1 wherein, said support member is provided with an outwardly projecting flange,
   said flange being confined between the forward end of said casing and the rear end of said warhead.

* * * * *